(12) United States Patent
Petersen

(10) Patent No.: US 9,158,390 B2
(45) Date of Patent: Oct. 13, 2015

(54) MECHANICAL ACTUATOR APPARATUS FOR A TOUCH SENSING SURFACE OF AN ELECTRONIC DEVICE

(71) Applicant: Darren C. Petersen, Montclair, NJ (US)

(72) Inventor: Darren C. Petersen, Montclair, NJ (US)

( * ) Notice: Subject to any disclaimer, the term of this patent is extended or adjusted under 35 U.S.C. 154(b) by 315 days.

(21) Appl. No.: 13/789,787

(22) Filed: Mar. 8, 2013

(65) Prior Publication Data

US 2014/0253445 A1    Sep. 11, 2014

(51) Int. Cl.
G06F 3/033    (2013.01)

(52) U.S. Cl.
CPC ............ *G06F 3/033* (2013.01); *Y10T 29/49826* (2015.01)

(58) Field of Classification Search
None
See application file for complete search history.

(56) References Cited

U.S. PATENT DOCUMENTS

| | | | | |
|---|---|---|---|---|
| 4,172,597 | A * | 10/1979 | Smith et al. | 273/239 |
| 4,366,355 | A * | 12/1982 | Oelsch | 200/517 |
| 4,600,807 | A | 7/1986 | Kable | |
| 4,600,819 | A * | 7/1986 | Twyford | 200/16 A |
| 4,676,509 | A * | 6/1987 | Bishop | 273/239 |
| 4,701,702 | A * | 10/1987 | Kruger | 324/754.14 |
| RE35,329 | E * | 9/1996 | Murakami et al. | 178/18.07 |
| 6,492,978 | B1 * | 12/2002 | Selig et al. | 345/173 |
| 6,606,081 | B1 | 8/2003 | Jaeger et al. | |
| 6,628,266 | B1 * | 9/2003 | Aguilar et al. | 345/161 |
| 6,903,662 | B2 | 6/2005 | Rix et al. | |
| 6,950,089 | B1 | 9/2005 | Jaeger | |
| 7,391,410 | B2 | 6/2008 | Lutnaes | |
| 7,924,145 | B2 | 4/2011 | Yuk et al. | |
| 8,138,869 | B1 | 3/2012 | Lauder et al. | |
| 8,143,982 | B1 | 3/2012 | Lauder et al. | |
| 8,143,983 | B1 | 3/2012 | Lauder et al. | |
| 8,199,114 | B1 | 6/2012 | Jaeger et al. | |
| 8,206,047 | B1 * | 6/2012 | Isaac et al. | 400/491 |
| 8,242,868 | B2 | 8/2012 | Lauder et al. | |
| 8,310,351 | B2 | 11/2012 | Krahenbuhl et al. | |
| 8,330,713 | B2 | 12/2012 | Stelandre et al. | |
| 8,576,192 | B1 * | 11/2013 | Reeves et al. | 345/173 |

(Continued)

FOREIGN PATENT DOCUMENTS

| | | |
|---|---|---|
| DE | 102009006153 | 7/2010 |
| KR | 10-2012-0099902 | 9/2012 |

(Continued)

OTHER PUBLICATIONS

PCT International Search Report and the Written Opinion in International App. No. PCT/US2014/019755 dated Sep. 9, 2014 (13 pp.).

(Continued)

*Primary Examiner* — Antonio Xavier
(74) *Attorney, Agent, or Firm* — Dinesh Agarwal, P.C.

(57) ABSTRACT

A mechanical actuator apparatus for an electronic device having a touch sensing surface, includes a mechanical actuator having a base for accommodating a first magnetic member, an attachment member having a second magnetic member for engaging the first magnetic member, wherein the attachment member includes a surface configured to mount directly over and engage the touch sensing surface. The mechanical actuator further includes a conductive member for contacting the touch sensing surface, and a non-conductive member for spacing the actuator a distance from the touch sensing surface. The mechanical actuator can be a joystick, knob, directional pad, slider, or the like input device.

41 Claims, 4 Drawing Sheets

(56) References Cited

U.S. PATENT DOCUMENTS

| | | | |
|---|---|---|---|
| 2002/0024503 A1* | 2/2002 | Armstrong | 345/167 |
| 2003/0235452 A1* | 12/2003 | Kraus et al. | 400/472 |
| 2004/0056781 A1* | 3/2004 | Rix et al. | 341/20 |
| 2004/0060217 A1 | 4/2004 | Ray, III et al. | |
| 2005/0164148 A1* | 7/2005 | Sinclair | 434/112 |
| 2005/0259074 A1* | 11/2005 | Lutnaes | 345/161 |
| 2006/0007179 A1* | 1/2006 | Pihlaja | 345/173 |
| 2006/0256090 A1* | 11/2006 | Huppi | 345/173 |
| 2006/0284710 A1* | 12/2006 | Takatsuka et al. | 335/205 |
| 2008/0012473 A1* | 1/2008 | Horikiri | 313/504 |
| 2008/0116885 A1 | 5/2008 | Van Zon et al. | |
| 2008/0238879 A1* | 10/2008 | Jaeger et al. | 345/173 |
| 2008/0303800 A1* | 12/2008 | Elwell | 345/173 |
| 2009/0084214 A1* | 4/2009 | Sakai et al. | 74/471 XY |
| 2009/0121848 A1* | 5/2009 | Yuk et al. | 340/407.2 |
| 2009/0213073 A1 | 8/2009 | Obermeyer et al. | |
| 2010/0020042 A1* | 1/2010 | Stelandre et al. | 345/174 |
| 2010/0079403 A1* | 4/2010 | Lynch et al. | 345/174 |
| 2010/0081505 A1* | 4/2010 | Alten et al. | 463/36 |
| 2010/0097327 A1* | 4/2010 | Wadsworth | 345/173 |
| 2010/0141411 A1* | 6/2010 | Ahn et al. | 340/407.2 |
| 2010/0265176 A1 | 10/2010 | Olsson et al. | |
| 2011/0005662 A1* | 1/2011 | Sung | 156/153 |
| 2011/0157056 A1* | 6/2011 | Karpfinger | 345/173 |
| 2011/0199325 A1 | 8/2011 | Payne | |
| 2011/0234507 A1* | 9/2011 | Chou et al. | 345/173 |
| 2011/0248947 A1 | 10/2011 | Krahenbuhl et al. | |
| 2012/0066873 A1* | 3/2012 | Lauder et al. | 24/303 |
| 2012/0098782 A1 | 4/2012 | Nam | |
| 2012/0154285 A1* | 6/2012 | Nagao | 345/168 |
| 2012/0156439 A1* | 6/2012 | Mori et al. | 428/189 |
| 2012/0162122 A1* | 6/2012 | Geaghan | 345/174 |
| 2012/0169597 A1* | 7/2012 | Liotta | 345/161 |
| 2012/0191304 A1* | 7/2012 | McKee et al. | 701/49 |
| 2012/0242592 A1* | 9/2012 | Rothkopf et al. | 345/173 |
| 2012/0313873 A1* | 12/2012 | Bright et al. | 345/173 |
| 2012/0327021 A1 | 12/2012 | Ryu et al. | |
| 2013/0002571 A1* | 1/2013 | Skinner | 345/173 |
| 2013/0038549 A1* | 2/2013 | Kitada et al. | 345/173 |
| 2013/0076649 A1* | 3/2013 | Myers et al. | 345/173 |
| 2013/0207911 A1 | 8/2013 | Barton et al. | |
| 2013/0215029 A1* | 8/2013 | Comer, Jr. | 345/161 |
| 2013/0271384 A1 | 10/2013 | Chuang et al. | |
| 2013/0278514 A1 | 10/2013 | Jeon et al. | |
| 2014/0014486 A1* | 1/2014 | Knighton et al. | 200/5 A |
| 2014/0049475 A1* | 2/2014 | Argiro | 345/172 |
| 2014/0077911 A1* | 3/2014 | Raisch | 335/306 |
| 2014/0176481 A1* | 6/2014 | Zhang et al. | 345/174 |
| 2014/0253446 A1* | 9/2014 | Petersen | 345/161 |
| 2014/0347575 A1* | 11/2014 | Shih et al. | 349/12 |

FOREIGN PATENT DOCUMENTS

| | | |
|---|---|---|
| WO | WO 2012/005463 A2 | 1/2012 |
| WO | WO 2012/094198 A1 | 7/2012 |
| WO | WO 2012/139203 A1 | 10/2012 |

OTHER PUBLICATIONS

PCT International Search Report and the Written Opinion in International App. No. PCT/US2014/019756 dated Jul. 28, 2014 (9 pp.).
"Touchscreen" *Wikipedia*, the free encyclopedia, http://en.wikipedia.org/wiki/Touchscreen. Accessed Feb. 21, 2013, 9 pp.
U.S. Appl. No. 13/789,807, filed Mar. 8, 2013.
Office Action dated Mar. 19, 2015, in co-pending U.S. Appl. No. 13/789,807, filed Mar. 8, 2013.

\* cited by examiner

MECHANICAL ACTUATOR APPARATUS FOR A TOUCH SENSING SURFACE OF AN ELECTRONIC DEVICE

FIELD AND BACKGROUND OF THE INVENTION

The present invention is generally directed to computer or electronic input devices, and more particularly to a mechanical actuator apparatus for an electronic device having a touch sensing surface.

The recent explosion in the popularity of hand-held electronic devices, such as smartphones, tablet computers, etc., has brought to the forefront touch sensing displays, touchscreens, and the like. Gone are the days of bulky cellular or mobile phones and huge laptops, which included the old-style keyboards. The modern cellular phones, for example, are known as "smartphones" that have the capability to perform many functions other than merely being a communication device. More particularly, these smartphones function as computing devices, GPS (global positioning system) devices, financial transaction devices, and perform many other functions that were previously performed by multiple individual devices. The old-style keypad or keyboard has now been replaced by a touchscreen or touch sensing display, which typically includes a touch sensing surface. The touchscreen or touch sensing display generally includes a virtual or digital onscreen keyboard in place of the old-style physical keyboard.

A touchscreen is an electronic visual display that a user can control via simple or multi-touch gestures by touching the screen with one or more fingers, a stylus, a tracer, or some other mechanical actuator, or other object, such as specially coated gloves. Various touchscreen technologies are currently available that utilize different methods of sensing touch. The examples include resistive, surface acoustic wave, capacitive, infrared grid, infrared acrylic projection, optical imaging, dispersive signal technology, acoustic pulse recognition, etc. In a typical application, the system determines the intended command based on the controls displayed on the screen and the location of the touch. "Touchscreen" *Wikipedia*, the free encyclopedia, http://en.wikipedia.org/wiki/Touchscreen. Accessed Feb. 21, 2013, 9 pp.

The smartphones, tablet computers, and the like, are also now being used to play electronic games that were traditionally played on home computers utilizing various accessories, such as joysticks, steering wheels, game controllers, and other similar input devices. In this regard, although a tablet or smartphone may include a virtual input device, such as an onscreen joystick, such arrangement lacks the full experience or the feel of manipulating, for example, a physical joystick. Therefore, the users, and particularly the electronic game enthusiasts, appreciate the use of a physical mechanical actuator, such as a joystick, in connection with an electronic device, such as a tablet computer, smartphone, and the like.

Various electronic devices, touch sensitive screens and displays, and input devices are disclosed in U.S. Patents/Publications Nos. U.S. Pat. No. 4,600,807; U.S. Pat. No. 6,606,081 B1; U.S. Pat. No. 6,903,662B2; U.S. Pat. No. 6,950,089B1; U.S. Pat. No. 7,391,410B2; U.S. Pat. No. 7,924,145B2; U.S. Pat. No. 8,138,869B1; U.S. Pat. No. 8,143,982B1; U.S. Pat. No. 8,143,983B1; U.S. Pat. No. 8,199,114B1; U.S. Pat. No. 8,242,868B2; U.S. Pat. No. 8,310,351B2; U.S. Pat. No. 8,330,713B2; 2006/0007179A1; 2006/0256090A1; 2010/0079403A1; 2011/0199325A1; 2011/0248947A1; 2012/0169597A1; 2013/0002571A1; and Foreign/PCT patent documents DE 102009006153; KR 10-2012-0099902; WO 2012/005463 A2; WO 2012/094198 A1, and WO 2012/139203 A1.

In view of the popularity of smartphones, tablets, and other electronic devices using touchscreens, and to provide the look-and-feel of an external input device, such as a joystick, slider, knob, directional pad, or the like, there is a need in the industry for a mechanical actuator apparatus that provides a user with the real look-and-feel of an actual physical actuator, when used on a touchscreen.

ASPECTS AND BRIEF SUMMARY OF THE INVENTION

The present disclosure is directed to various aspects of the present invention.

One aspect of the present invention is to provide a mechanical actuator apparatus for a touch sensing surface of an electronic device.

Another aspect of the present invention is to provide a joystick apparatus for a touch sensing surface of an electronic device.

Another aspect of the present invention is to provide a mechanical actuator or joystick apparatus, which allows an external actuator, such as a joystick, to be directly mounted over and engage a touch sensing surface of an electronic device. The apparatus allows a quick and easy substitution of the actuator or joystick, as needed.

Another aspect of the present invention is to provide a mechanical actuator or joystick apparatus, which allows an external actuator, such as a joystick, to be directly mounted over and engage a touch sensing surface of an electronic device. The apparatus allows a quick and easy connect or disconnect of the actuator or joystick, and positioning thereof anywhere over the touch sensing surface.

Another aspect of the present invention is to provide a mechanical actuator apparatus for an electronic device having a touch sensing surface, which comprises a mechanical actuator including a base for accommodating a first magnetic member, an attachment member including a second magnetic member for engaging the first magnetic member, wherein the attachment member includes a surface configured to mount directly over and engage the touch sensing surface. The mechanical actuator further includes a conductive member for contacting the touch sensing surface, and a non-conductive member for spacing the actuator a distance from the touch sensing surface.

Another aspect of the present invention is to provide a joystick apparatus for an electronic device having a touch sensing surface, which comprises a joystick including a handle portion and a cooperating base portion with an upstanding sleeve. The handle portion includes a skirt portion for operably engaging the sleeve for thereby securing a first magnetic member therebetween. An attachment member includes a second magnetic member for engaging the first magnetic member, and a surface configured to mount directly over and engage the touch sensing surface. The base portion includes a conductive member for contacting the touch sensing surface.

Another aspect of the present invention is to provide a mechanical actuator apparatus for an electronic device having a touch sensing surface, which comprises a mechanical actuator including a base for accommodating a magnetic member, and an attachment member including a magnetic mesh for engaging the first magnetic member and a surface configured to mount directly over and engage the touch sensing surface. The mechanical actuator further includes a conductive member for contacting the touch sensing surface, and a non-conductive member for spacing the actuator a distance from the touch sensing surface.

Another aspect of the present invention is to provide a method of attaching a mechanical actuator apparatus to a touch sensing surface, which comprises a) providing a mechanical actuator apparatus including a mechanical actuator having a first magnetic member, and an attachment member including a second magnetic member for engaging the first magnetic member, a surface configured to mount directly over and engage the touch sensing surface, a conductive member for contacting the touch sensing surface, and a non-conductive member for spacing the actuator a distance from the touch sensing surface, b) mounting the attachment member immovably over and in engagement with the touch sensing surface, and c) manipulating the mechanical actuator so as to engage the first magnetic member with the second magnetic member.

In summary, the present invention provides a mechanical actuator apparatus that can be easily used with the touchscreen of an electronic device, such as a tablet, cellular phone, fablet, phablet, etc., and which allows the user with the real look-and-feel of an external input device, such as a joystick. The actuator apparatus further provides the flexibility of easily switching between external input devices, as desired.

BRIEF DESCRIPTION OF THE DRAWINGS

One of the above and other aspects, novel features and advantages of the present invention will become apparent from the following detailed description of a preferred embodiment(s) of the invention, as illustrated in the drawings, in which.

DETAILED DESCRIPTION OF THE PREFERRED EMBODIMENT(S) OF THE INVENTION

Figure 1:
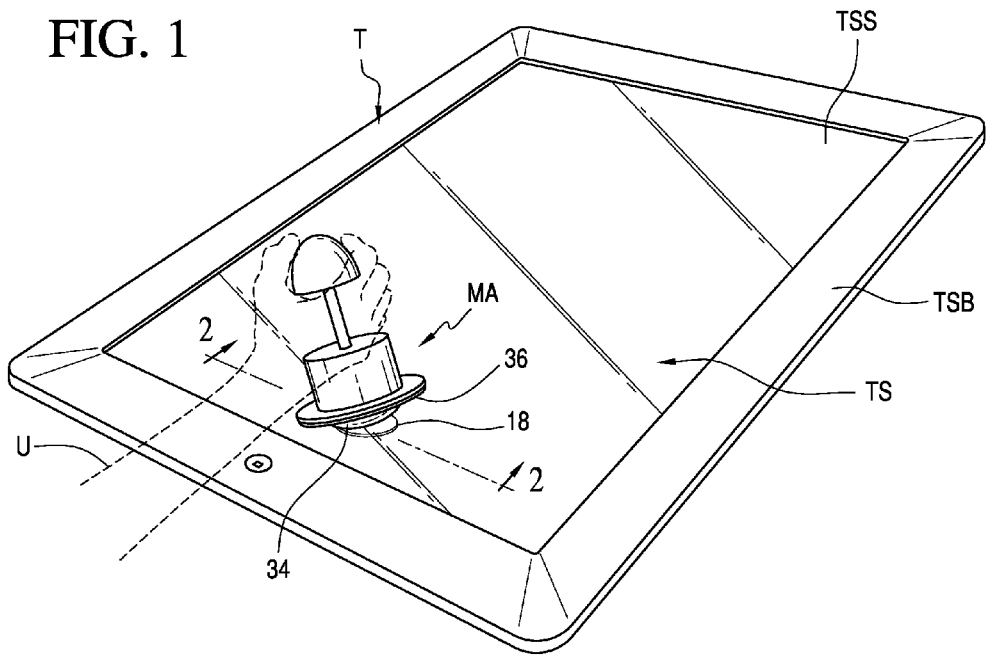
FIG. 1 is a perspective view of a preferred embodiment of a mechanical actuator apparatus of the present invention, shown in use in conjunction with a tablet.
Figure 2:
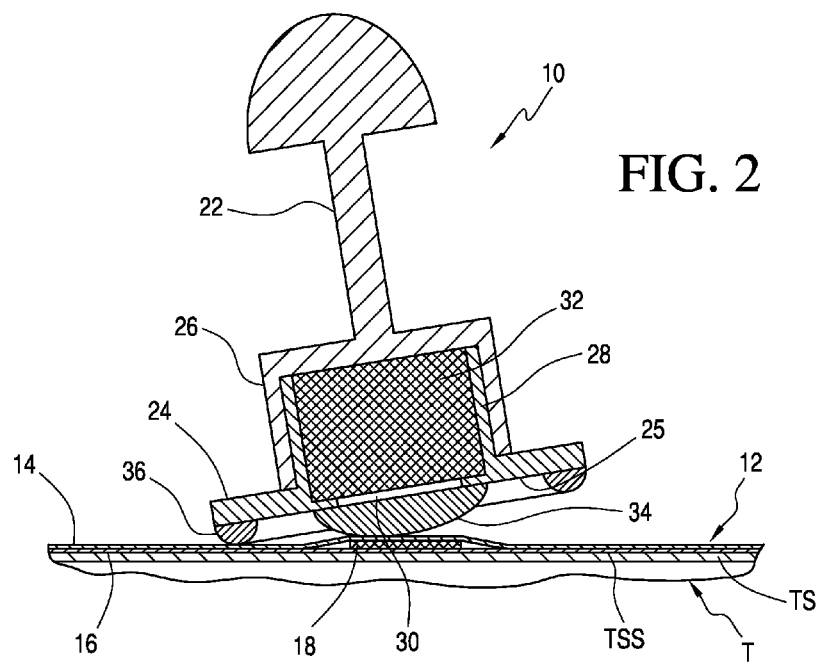
FIG. 2 is an enlarged cross-sectional view taken along line 2-2 of FIG. 1.
Figure 3:
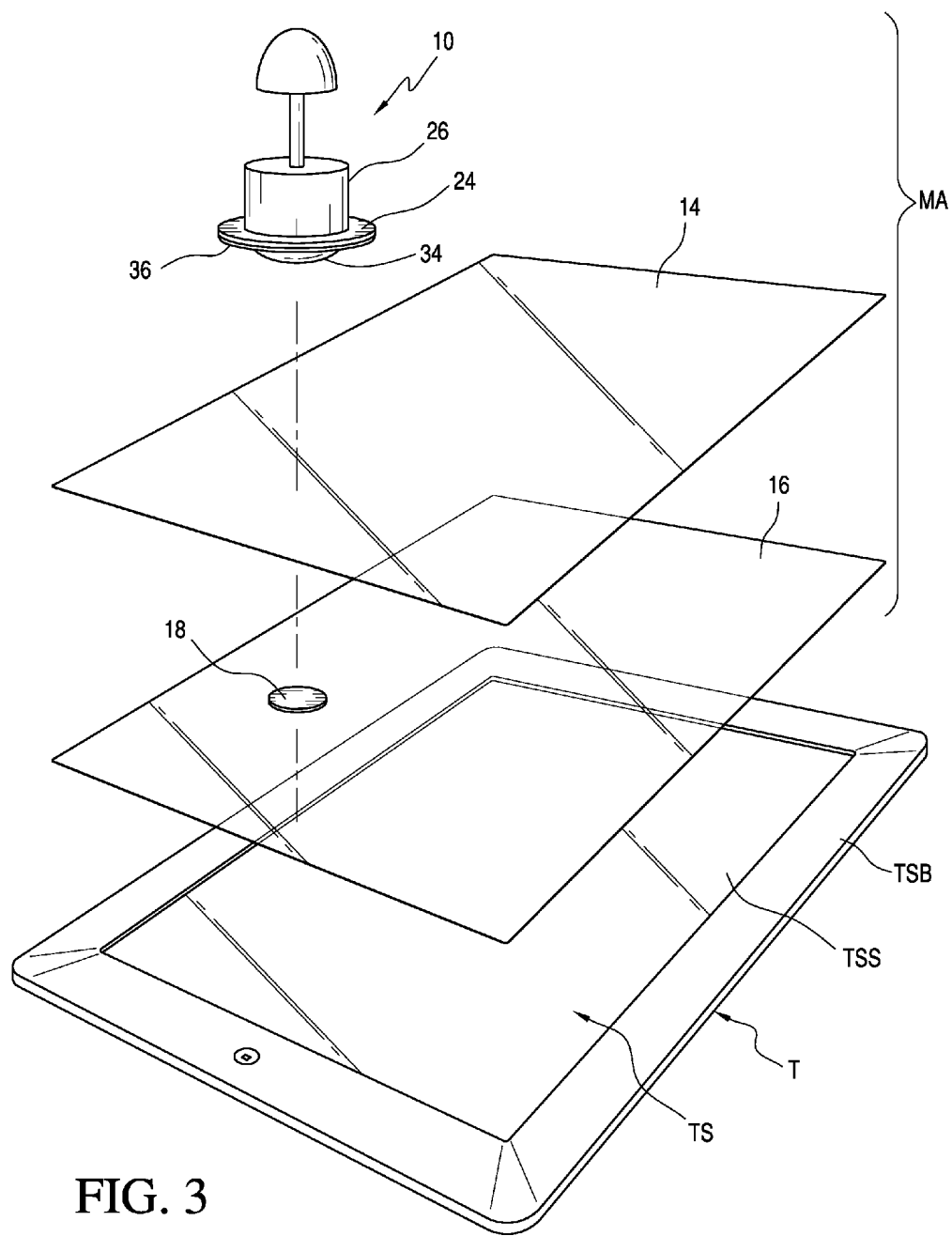
FIG. 3 is a partial exploded view of the mechanical actuator shown in FIG. 1.

As best shown in FIGS. 1-3, the mechanical actuator apparatus MA, in accordance with a preferred embodiment of the invention, includes a joystick 10, and an attachment member 12, both configured and constructed to function in operative engagement with each other, as described in more detail below.

The attachment member 12, preferably includes top and bottom clear films 14 and 16, sandwiching therebetween a magnetic member 18 of a suitable size and shape at a preferred location that can be varied. In particular, the films 14 and 16 are preferably held together by a temporary adhesive (not shown), or by electrostatic charge. In this manner, the films 14 and 16 can be separated to shift the magnetic member 18 to a different location, and secured back together for use on an electronic device, such as a tablet T. The films 14 and 16 are preferably made of a flexible, yet durable polyethylene or the like material having a thickness in the range of about 0.2 mm to 2 mm.

Figure 5:
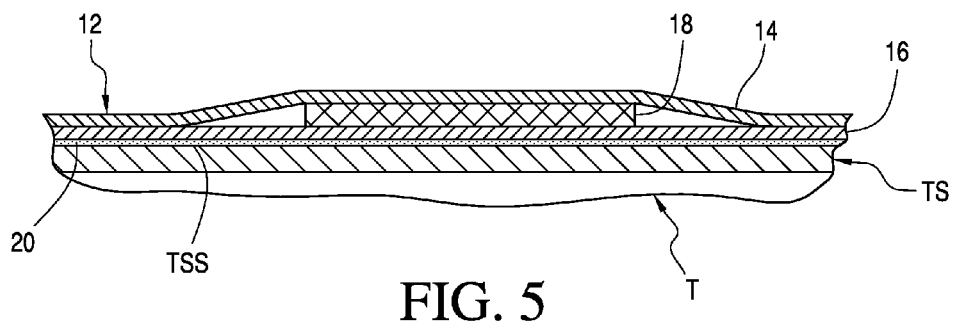
FIG. 5 is an enlarged view similar to FIG. 2, shown without the mechanical actuator (joystick)

As best shown in FIG. 5, the bottom film 16 preferably includes a temporary or permanent adhesive layer 20 on the underside thereof for securing over the touchscreen TS of the tablet T. Alternatively, the attachment member 12 can be mounted over the touchscreen TS by employing electrostatic, magnetostatic, or electromagnetic charge or suction force, or a combination thereof.

As best illustrated in FIG. 3, the size of the attachment member 12 is selected to preferably correspond to the size of the touchscreen TS, so that it fits neatly thereover just short of the internal limits of the border section TSB thereof. It is noted, however, that it is within the scope of the present invention to vary the overall size of the attachment member 12 to be smaller or larger than the size of the touchscreen TS. In this regard, if larger, the attachment member 12 would simply extend beyond the touchscreen TS, and partially or entirely cover the touchscreen border section TSB.

Referring to FIG. 2, the preferred structural details of the joystick 10 will now be described. As shown, the joystick 10 includes an upper handle portion 22, and a cooperating lower base portion 24. The handle portion 22 includes a skirt 26 that engages with an upstanding sleeve 28 of the base portion 24. The skirt 26 and sleeve 28, together define therebetween a recess 30 for accommodating a magnetic member 32 of a suitable size and shape. It is noted herewith that the interfitting construction and arrangement of the skirt 26 and sleeve 28 may be varied or reversed, if needed. For instance, in an alternate arrangement, the skirt 26 would fit inside the sleeve 28, instead of sliding over, as shown in FIG. 2.

The joystick 10 further includes a non-conductive pad 34 or the like member positioned preferably centrally on the base portion 24. The thickness of the non-conductive member 34 is selected to keep the bottom surface 25 of the base portion 24 a preferred distance (0.5 mm-3 mm) from the touchscreen surface TSS, thereby allowing a user to manipulate or rock the joystick 10, during use. In this regard, a continuous (or segmented) strip of conductive pad 36 or the like is provided along the periphery on the bottom surface 25 of the base portion 24. Alternatively, the conductive pad 36 may cover the entire bottom surface 25. The conductive pad 36 is preferably made of a material including silicone resin, vinyl chloride resin, siloxane resin, and/or a polyolefin resin, doped with a conductive metal or filler. Preferably, the height of the joystick 10 is 30-60 mm. One skilled in the art would readily appreciate that by manipulating the joystick 10, a user U can easily make a contact with the touch sensing surface TSS, as desired (FIGS. 1 and 2).

From the above description, and as illustrated in FIGS. 1-3 and 5, it would be readily appreciated that by mounting the attachment member 12 over the touch sensing surface TSS of the touchscreen TS, and manipulating the joystick 10 over the magnetic member 18, the joystick 10 can be held thereover due to the magnetic force between the magnetic members 18 and 32. In this regard, it is noted herewith that the term "magnetic member" as used herein, includes, but not limited to, a permanent magnet or electromagnet, and a member that is attractable to or by a magnet. It is also noted herewith that if a user desires to change or move the location of the joystick 10 over the touch sensing surface TSS, he or she can simply peel the films 14 and 16 apart, move the magnetic member 18 to another desired location, and simply attach the films 14 and 16 back together. If the attachment member 12 is smaller than the touchscreen TS, then the entire attachment member 12 can simply be moved to the desired location.

Figure 4:
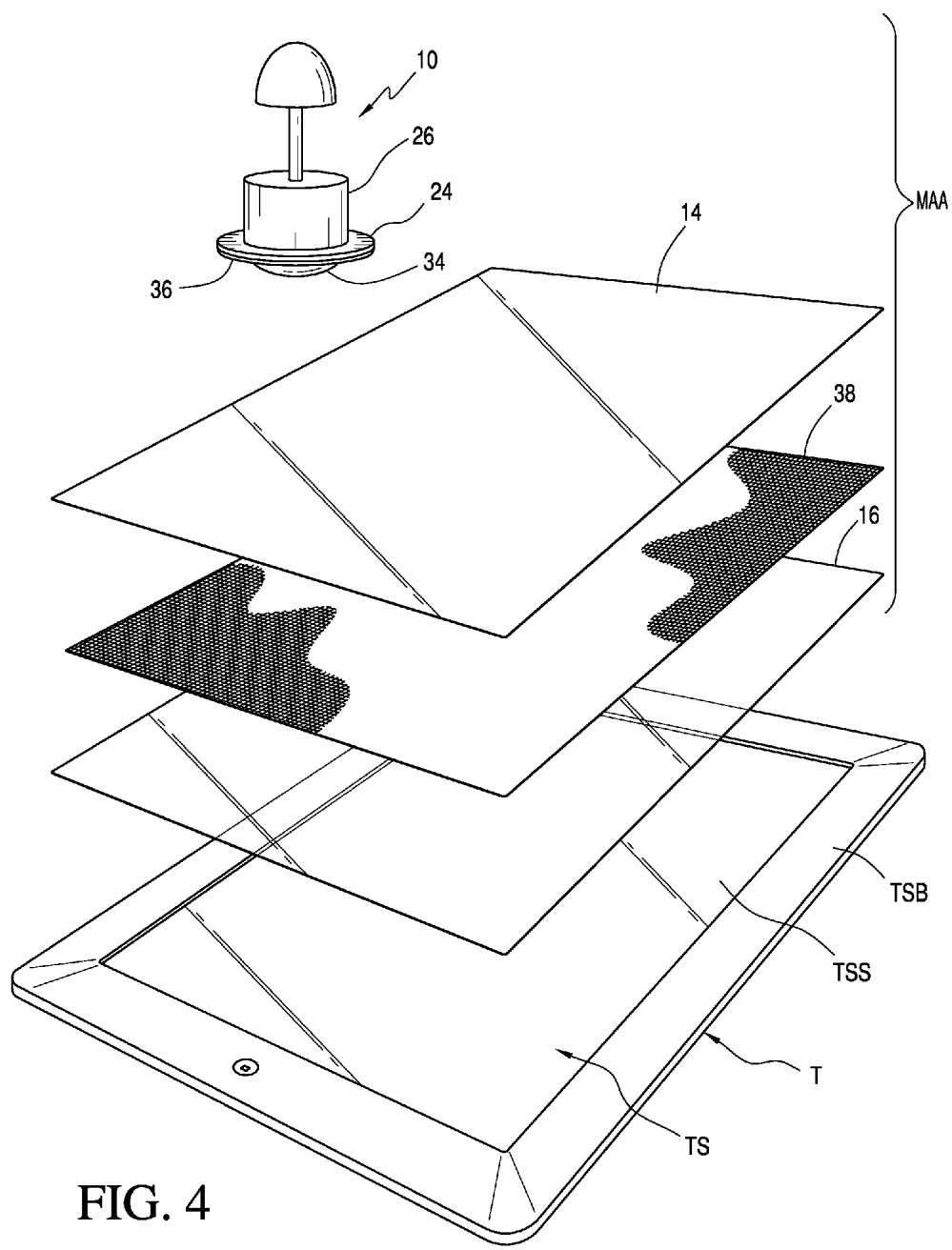
FIG. 4 is a view similar to FIG. 3, showing an alternate preferred embodiment of the mechanical actuator apparatus of the present invention.
Figure 6:
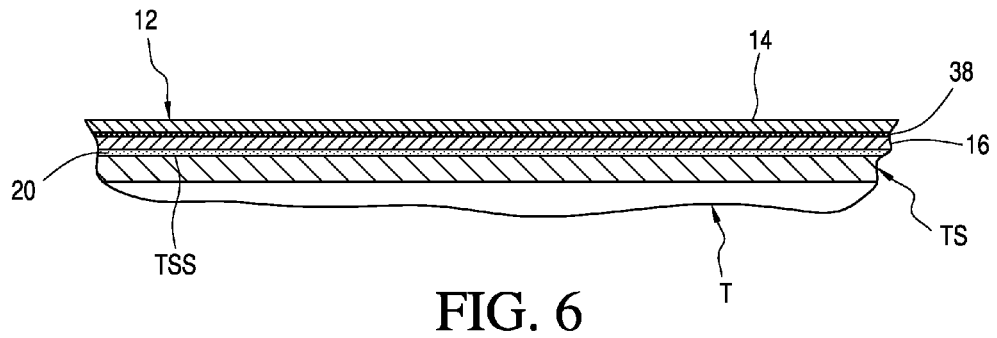
FIG. 6 is a view similar to FIG. 5, showing the alternate embodiment of FIG. 4.

FIGS. 4 and 6 illustrate an alternate preferred embodiment of the mechanical actuator apparatus MAA of the present invention, which is similar to the embodiment described above, with the exception that the magnetic member 18 is substituted by a magnetic mesh 38 of a suitable thickness and design, and preferably corresponding in size to the top and bottom films 14 and 16. (It is noted herewith that the same or similar components of the two embodiments have been designated by the same reference numerals.)

Although not shown, the magnetic mesh 38 is secured between the top and bottom films 14 and 16, preferably by using a temporary or permanent adhesive, or other means, such as electrostatic, magnetostatic, electromagnetic, etc., force. The size of the magnetic mesh 38 can be varied to correspond to the size of the top and bottom films 14 and 16, as noted above with respect to the first embodiment.

One would readily appreciate the advantage of providing the magnetic mesh 38 between the top and bottom films 14 and 16, in that once mounted over the touch sensing surface TSS, a user can position the joystick 10 anywhere on the touchscreen TS, by simply detaching the joystick 10 from one position and re-positioning at another location, using the magnetic force between the magnetic member 32 and the magnetic mesh 38.

It is noted herewith that while the present invention is described and illustrated in conjunction with a tablet, it can be used with any electronic device, including, but not limited to, a television, videogame monitor, videogame console, a gaming device, a desktop computer, a laptop computer, a personal digital assistant (PDA), a fablet, a phablet, a cellphone, a mobile phone, a smartphone, or a combination thereof.

While this invention has been described as having preferred sequences, ranges, steps, order of steps, materials, structures, symbols, indicia, graphics, color scheme(s), shapes, configurations, features, components, or designs, it is understood that it is capable of further modifications, uses and/or adaptations of the invention following in general the principle of the invention, and including such departures from the present disclosure as those come within the known or customary practice in the art to which the invention pertains, and as may be applied to the central features hereinbefore set forth, and fall within the scope of the invention and of the limits of the claims appended hereto or presented later. The invention, therefore, is not limited to the preferred embodiment(s) shown/described herein.

REFERENCES

The following reference, and any cited in the disclosure herein, are hereby incorporated herein in their entirety by reference.
1. "Touchscreen" *Wikipedia*, the free encyclopedia, http://en.wikipedia.org/wiki/Touchscreen. Accessed Feb. 21, 2013, 9 pp.

What is claimed is:

1. A mechanical actuator apparatus for an electronic device having a touch sensing surface, comprising:
   a) a mechanical actuator including a base for accommodating a first magnetic member;
   b) a flexible attachment member including a second magnetic member for engaging said first magnetic member;
   c) said attachment member including a surface configured to mount directly over and engage the touch sensing surface;
   d) said mechanical actuator including a conductive member for contacting the touch sensing surface; and
   e) said mechanical actuator including a non-conductive member for spacing the actuator a distance from and contacting the touch sensing surface.
2. The actuator apparatus of claim 1, wherein:
   a) said second magnetic member is immovably positioned relative to said attachment member.
3. The actuator apparatus of claim 2, wherein:
   a) said attachment member is immovably mounted over the touch sensing surface.
4. The actuator apparatus of claim 3, wherein:
   a) the surface of said attachment member includes a temporary or permanent adhesive.
5. The actuator apparatus of claim 4, wherein:
   a) said attachment member is made of a clear plastic film substantially corresponding in size to the touch sensing surface.
6. The actuator apparatus of claim 5, wherein:
   a) the mechanical actuator comprises a joystick.
7. The actuator apparatus of claim 1, wherein:
   a) said attachment member comprises a film having said second magnetic member embedded therein.
8. The actuator apparatus of claim 1, wherein:
   a) said attachment member comprises two films sandwiching said second magnetic member therebetween.
9. The actuator apparatus of claim 8, wherein:
   a) said second magnetic member comprises a magnetic mesh.
10. The actuator apparatus of claim 1, wherein:
    a) said attachment member comprises a film having said second magnetic member attached thereto.
11. The actuator apparatus of claim 10, wherein:
    a) said second magnetic member comprises a magnetic mesh.
12. The actuator apparatus of claim 1, wherein:
    a) the electronic device comprises a television, videogame monitor, videogame console, a gaming device, a desktop computer, a laptop computer, a tablet, a personal digital assistant (PDA), a fablet, a phablet, a cellphone, a mobile phone, a smartphone, or a combination thereof.
13. A joystick apparatus for an electronic device having a touch sensing surface, comprising:
    a) a joystick including a handle portion and a cooperating base portion;
    b) said base portion including an upstanding sleeve;
    c) said handle portion including a skirt portion for operably engaging said sleeve for thereby securing a first magnetic member therebetween;
    d) an attachment member including a second magnetic member for engaging said first magnetic member;
    e) said attachment member including a surface configured to mount directly over and engage the touch sensing surface; and
    f) said base portion including a conductive member for contacting the touch sensing surface.
14. The joystick apparatus of claim 13, wherein:
    a) said second magnetic member is immovably positioned relative to said attachment member.
15. The joystick apparatus of claim 14, wherein:
    a) said attachment member is immovably mounted over the touch sensing surface.
16. The joystick apparatus of claim 15 wherein:
    a) the surface of said attachment member includes electrostatic, magnetostatic, or electromagnetic properties.
17. The joystick apparatus of claim 15, wherein:
    a) the surface of said attachment member includes a temporary or permanent adhesive.

18. The joystick apparatus of claim 13, wherein:
a) said attachment member comprises a film having said second magnetic member embedded therein.

19. The joystick apparatus of claim 13, wherein:
a) said attachment member comprises two films sandwiching said second magnetic member therebetween.

20. The joystick apparatus of claim 19, wherein:
a) said second magnetic member comprises a magnetic mesh.

21. The joystick apparatus of claim 13, wherein:
a) said upstanding sleeve defines a recess therein for holding said first magnetic member.

22. The joystick apparatus of claim 13, wherein:
a) said skirt portion defines a recess therein for holding said first magnetic member.

23. The joystick apparatus of claim 13, wherein:
a) said attachment member comprises a film having said second magnetic member attached thereto.

24. The joystick apparatus of claim 23, wherein:
a) said second magnetic member comprises a magnetic mesh.

25. The actuator apparatus of claim 13, wherein:
a) the electronic device comprises a television, videogame monitor, videogame console, a gaming device, a desktop computer, a laptop computer, a tablet, a personal digital assistant (PDA), a fablet, a phablet, a cellphone, a mobile phone, a smartphone, or a combination thereof.

26. A mechanical actuator apparatus for an electronic device having a touch sensing surface, comprising:
a) a mechanical actuator including a base for accommodating a magnetic member;
b) a flexible attachment member including a magnetic mesh for engaging said magnetic member;
c) said attachment member including a surface configured to mount directly over and engage the touch sensing surface;
d) said mechanical actuator including a conductive member for contacting the touch sensing surface; and
e) said mechanical actuator including a non-conductive member for spacing the actuator a distance from and contacting the touch sensing surface.

27. The actuator apparatus of claim 26, wherein:
a) said attachment member comprises a film having said magnetic mesh attached thereto.

28. The actuator apparatus of claim 27, wherein:
a) said film substantially corresponds in size to the touch sensing surface.

29. The actuator apparatus of claim 28, wherein:
a) said magnetic mesh corresponds in size to said film.

30. The actuator apparatus of claim 28, wherein:
a) the mechanical actuator comprises a joystick.

31. The actuator apparatus of claim 26, wherein:
a) said attachment member comprises two films sandwiching said magnetic mesh therebetween.

32. The actuator apparatus of claim 26, wherein:
a) the surface of said attachment member includes a temporary or permanent adhesive.

33. A method of attaching a mechanical actuator apparatus to a touch sensing surface, comprising the steps of:
a) providing a mechanical actuator apparatus, comprising:
i) a mechanical actuator including a first magnetic member;
ii) a flexible attachment member including a second magnetic member for engaging the first magnetic member;
iii) the attachment member including a surface configured to mount directly over and engage the touch sensing surface;
iv) the mechanical actuator including a conductive member for contacting the touch sensing surface; and
v) the mechanical actuator including a non-conductive member for spacing the actuator a distance from and contacting the touch sensing surface;
b) mounting the attachment member immovably over and in engagement with the touch sensing surface; and
c) manipulating the mechanical actuator so as to engage the first magnetic member with the second magnetic member.

34. The method of claim 33, wherein:
a) the mechanical actuator comprises a joystick actuator.

35. The method of claim 34, wherein:
the joystick actuator, comprises:
i) a joystick including a handle portion and a cooperating base portion;
ii) the base portion including an upstanding sleeve; and
iii) the handle portion including a skirt portion for operably engaging the sleeve for thereby securing the first magnetic member therebetween; and
iv) the base portion including a conductive member for contacting the touch sensing surface.

36. The method of claim 35, wherein:
the base portion defines a recess therein for holding the first magnetic member.

37. The method of claim 35, wherein:
the skirt portion defines a recess therein for holding the first magnetic member.

38. The method of claim 33, wherein:
the second magnetic member comprises a magnetic mesh.

39. A method of attaching a mechanical actuator apparatus to a touch sensing surface, comprising the steps of:
a) providing a mechanical actuator apparatus, comprising:
i) a joystick actuator including a first magnetic member and comprising:
a joystick including a handle portion and a cooperating base portion;
the base portion including an upstanding sleeve;
the handle portion including a skirt portion for operably engaging the sleeve for thereby securing the first magnetic member therebetween; and
the base portion including a conductive member for contacting the touch sensing surface;
ii) an attachment member including a second magnetic member for engaging the first magnetic member;
iii) the attachment member including a surface configured to mount directly over and engage the touch sensing surface;
iv) the mechanical actuator including a conductive member for contacting the touch sensing surface; and
v) the mechanical actuator including a non-conductive member for spacing the actuator a distance from the touch sensing surface;
b) mounting the attachment member immovably over and in engagement with the touch sensing surface; and
c) manipulating the mechanical actuator so as to engage the first magnetic member with the second magnetic member.

40. The method of claim 39, wherein:
the base portion defines a recess therein for holding the first magnetic member.

41. The method of claim 39, wherein:
the skirt portion defines a recess therein for holding the first magnetic member.

* * * * *